United States Patent [19]
Candor

[11] 3,893,898
[45] July 8, 1975

[54] METHOD FOR REMOVING AND/OR SEPARATING PARTICLES FROM FLUID CONTAINING THE SAME

[76] Inventor: James T. Candor, 5440 Cynthia Ln., Washington Twp., Ohio 45429

[22] Filed: Aug. 21, 1974

[21] Appl. No.: 499,178

Related U.S. Application Data
[60] Continuation-in-part of Ser. No. 383,255, July 27, 1973, which is a division of Ser. No. 263,605, June 16, 1972, Pat. No. 3,795,605, which is a continuation-in-part of Ser. No. 53,402, July 9, 1970, abandoned, which is a continuation-in-part of Ser. No. 25,938, April 6, 1970, Pat. No. 3,687,834, which is a continuation-in-part of Ser. No. 864,851, Oct. 8, 1969, abandoned, which is a continuation-in-part of Ser. No. 811,421, March 28, 1969, abandoned.

[52] U.S. Cl. .............................. 204/180 R; 204/186
[51] Int. Cl. ............................................. B01k 5/00
[58] Field of Search ................ 204/180 R, 186, 299

[56] References Cited
UNITED STATES PATENTS

| | | | |
|---|---|---|---|
| 2,555,487 | 6/1951 | Haugaard et al. | 204/180 R |
| 3,207,684 | 9/1965 | Dotts, Jr. | 204/180 R |
| 3,287,244 | 11/1966 | Mel | 204/180 R |
| 3,478,494 | 11/1969 | Lustenader et al. | 204/180 R X |
| 3,496,701 | 2/1970 | Owe Berg | 204/180 R X |

*Primary Examiner*—John H. Mack
*Assistant Examiner*—A. C. Prescott
*Attorney, Agent, or Firm*—Candor, Candor & Tassone

[57] ABSTRACT

Method having electrostatic means for removing particles from a fluid containing the same, the electrostatic means comprising charged electrode means electrically insulated from the fluid so that the electrostatic field thereof draws the particles into exit means of a passage defining means having the fluid therethrough. Such charged electrode means create a plurality of alternately arranged non-uniform fields across the fluid in the passage means so that the particles enter the exit means adjacent the more intense portions of the non-uniform fields, such electrodes also creating electroconvection in said fluid. Such passage means can comprise means for straight laminar flow of the fluid therethrough by being disposed adjacent or in another passage means having a particle receiving fluid stream flow therethrough. Such other passage means can receive particles of opposite polarity to neutralize the electric field created by charged particle separation.

10 Claims, 27 Drawing Figures

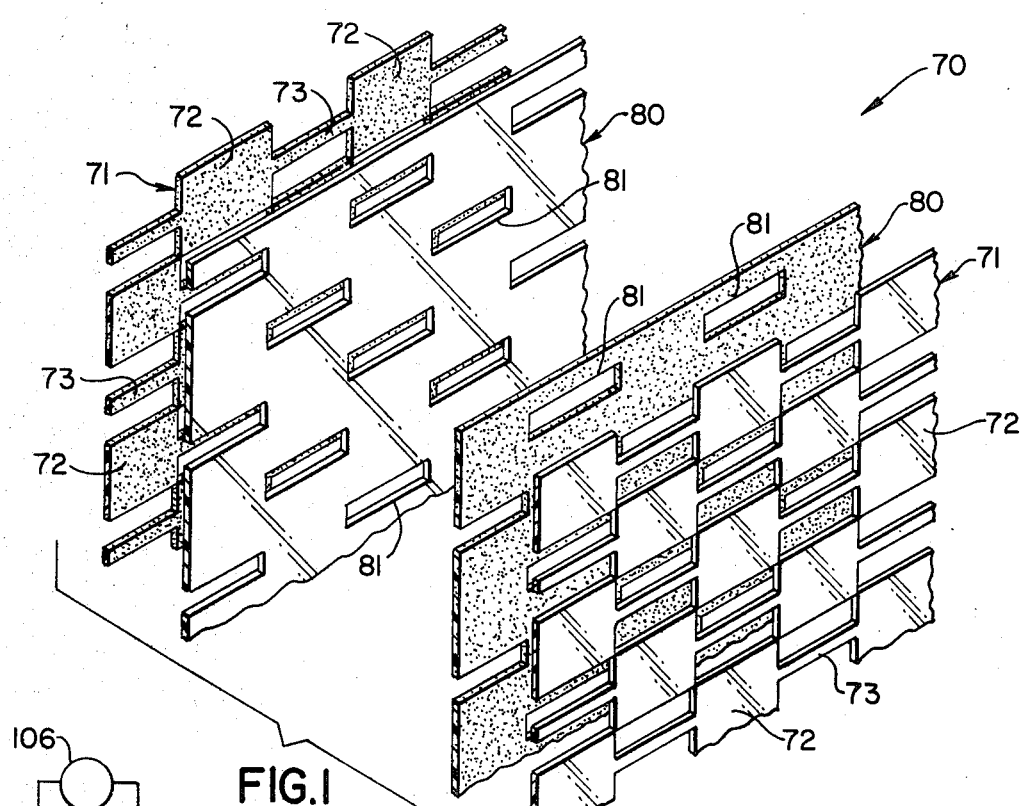
FIG.1
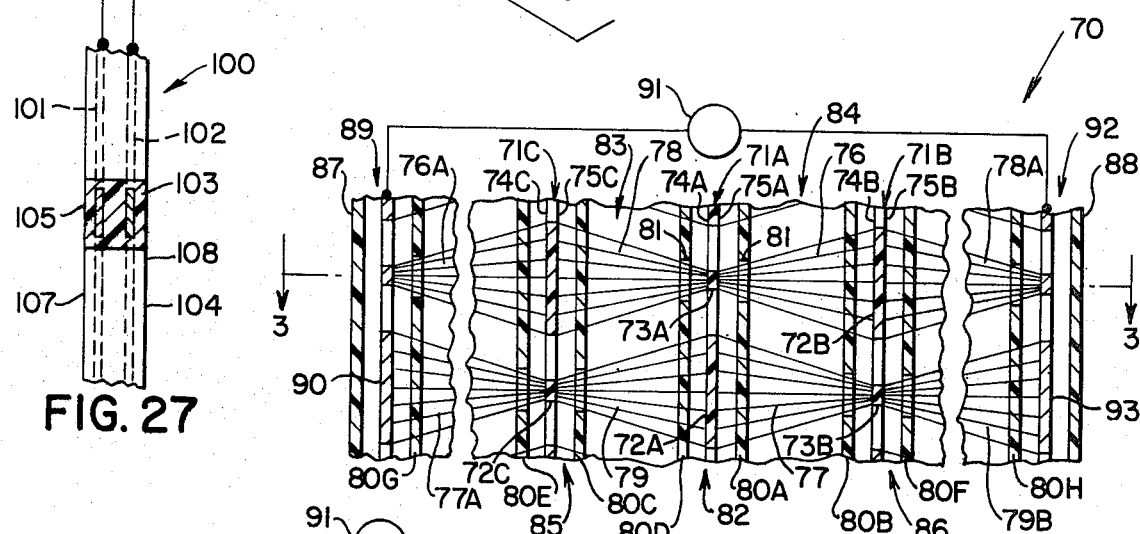
FIG.27
FIG.2
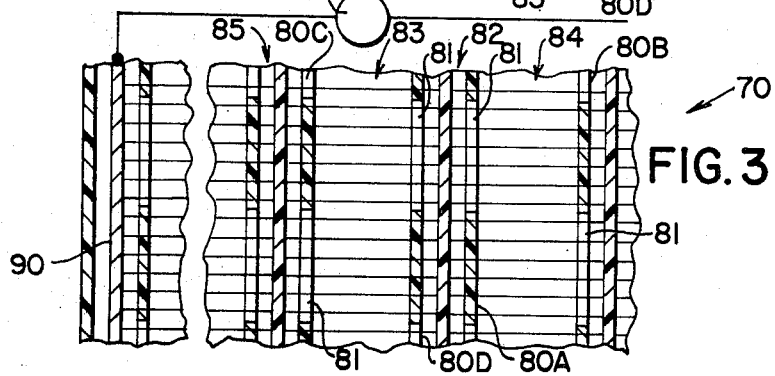
FIG.3

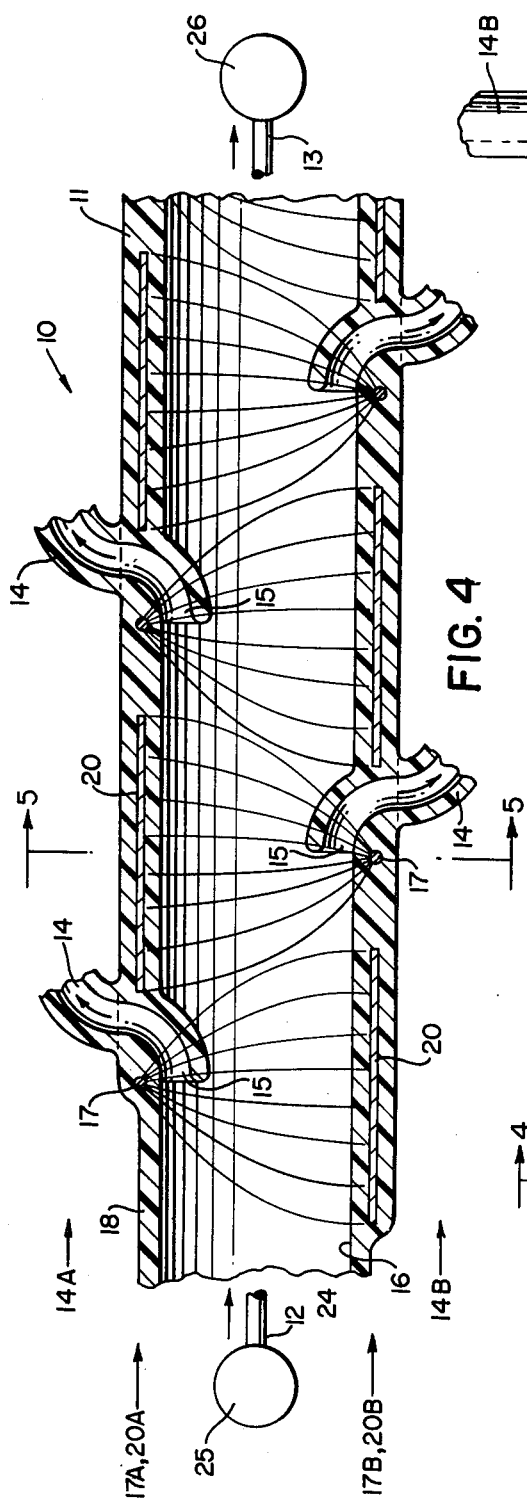
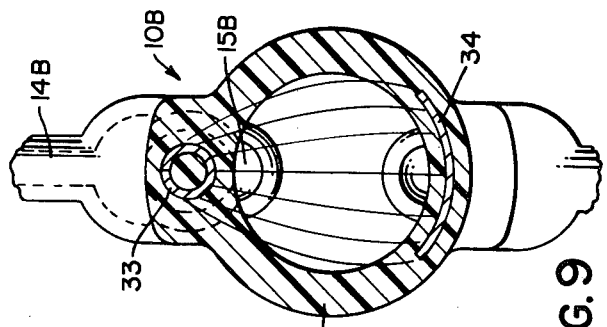
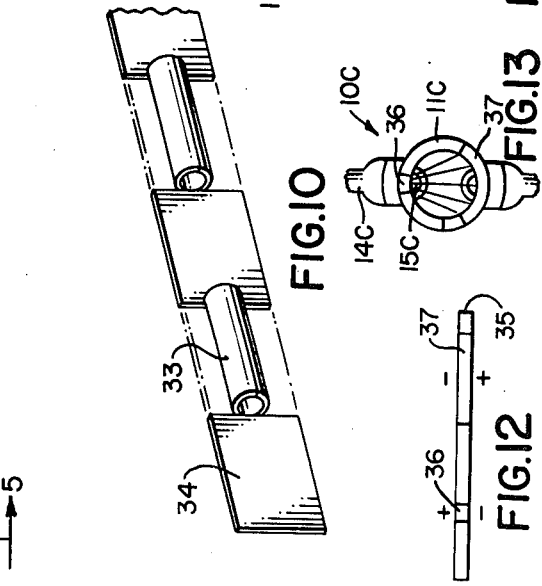
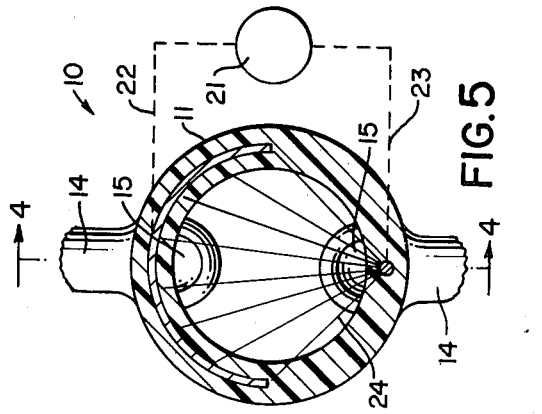

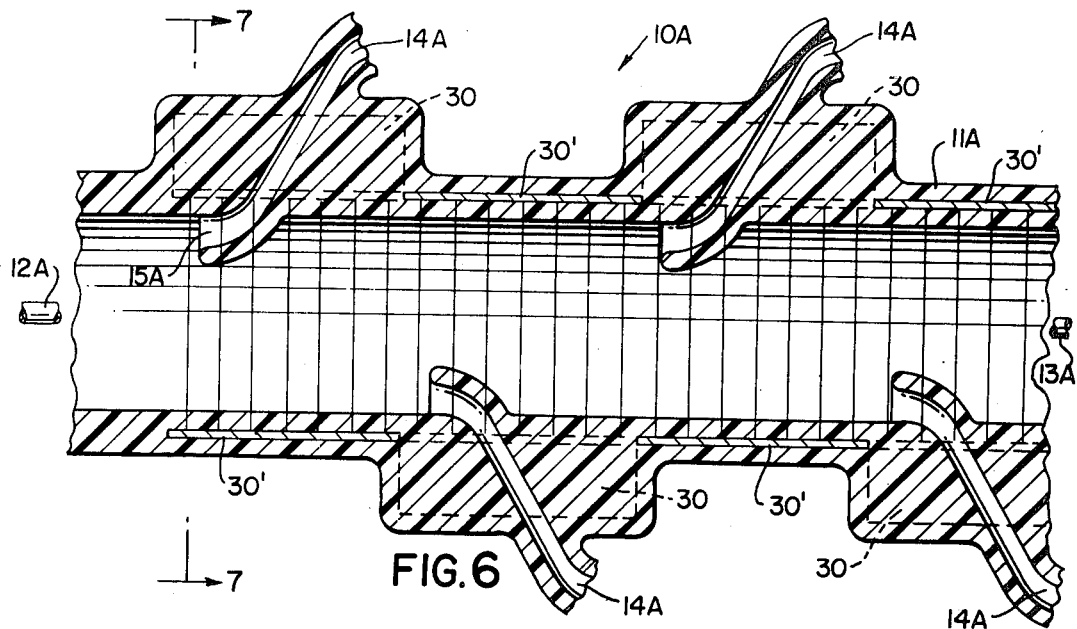
FIG. 6
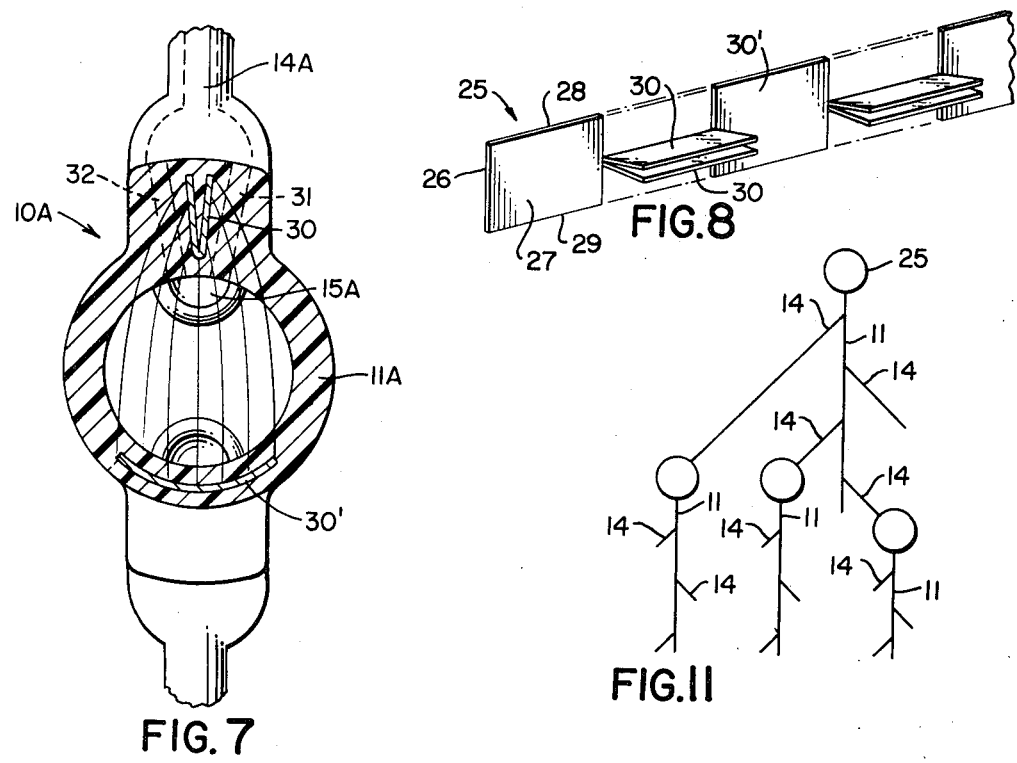
FIG. 7
FIG. 8
FIG. 11

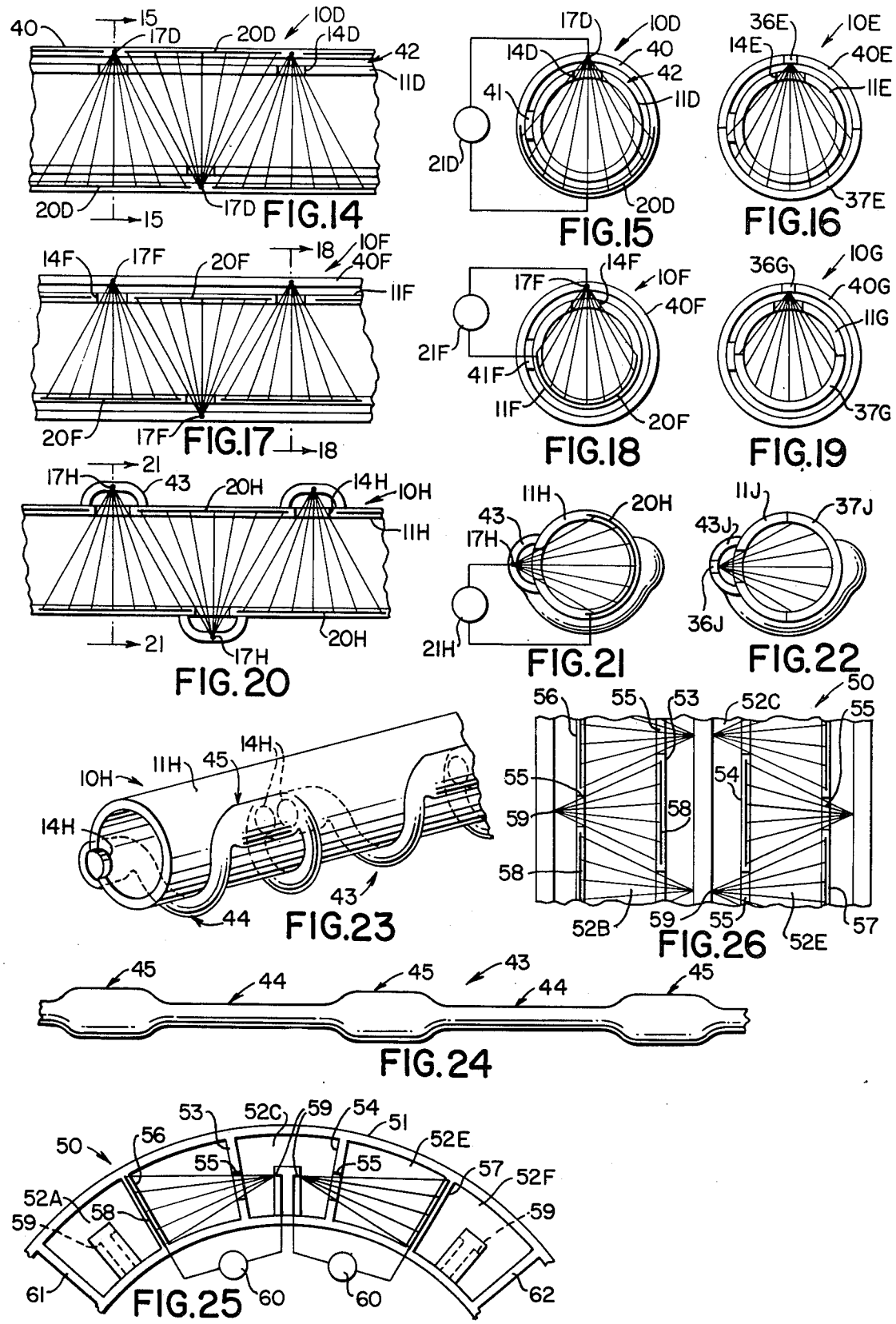

METHOD FOR REMOVING AND/OR SEPARATING PARTICLES FROM FLUID CONTAINING THE SAME

This application is a continuation-in-part application of its copending parent patent application, Ser. No. 383,255, filed Jul. 27, 1973, which, in turn, is a divisional application of its copending parent patent application, Ser. No. 263,605, filed Jun. 16, 1972, now U.S. Pat. No. 3,795,605, which, in turn, is a continuation-in-part application of its copending parent patent application, Ser. No. 53,402, filed Jul. 9, 1970, abandoned in favor of this application and which, in turn, is a continuation-in-part patent application of its copending parent patent application, Ser. No. 25,938, now U.S. Pat. No. 3,687,834, filed Apr. 6, 1970, which, in turn, is a continuation-in-part of its copending parent patent application, Ser. No. 864,851, filed Oct. 8, 1969, now abandoned, which, in turn, is a continuation-in-part patent application of its copending parent patent application, Ser. No. 811,421, filed Mar. 28, 1969, and now abandoned.

This invention relates to an improved method for removing and/or separating particles from a fluid containing the same.

A feature of this invention is to provide a method for removing and/or separating particles from a fluid containing the same, whether the fluid be gaseous or liquid and whether the particles are charged particles or neutral particles.

In particular, one embodiment of this invention provides a passage defining means having inlet means and outlet means and an exit means intermediate the inlet and outlet means. Means are provided for directing the particle containing fluid into the inlet means. Electrostatic means are provided for attracting at least some of the particles toward the exit means solely by an electrostatic attraction thereof so that the attracted particles will pass out through the exit means. Means are provided for removing the particle reduced fluid from the outlet means. The electrostatic means can comprise charged electrode means electrically insulated from the fluid so that the particles are attracted to the exit means solely by the electrostatic field force created by the electrode means whereby an electrical current is not passed through the fluid. The electrostatic means can create electroconvection in the fluid of the passage defining means. If desired, the passage defining means can provide for laminar flow of the fluid therethrough while still causing the particles to pass out of the exit means thereof. The various passage defining means can be so arranged that the field effect produced by charged particle separation is substantially neutralized.

Accordingly, it is an object of this invention to provide an improved method for removing and/or separating particles and the like from a fluid containing the same, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a fragmentary, perspective view illustrating electrodes and separators for providing one embodiment of the method and apparatus of this invention illustrated in FIGS. 2 and 3.

FIG. 2 is a vertical broken and fragmentary cross-sectional view of the apparatus of this invention.

FIG. 3 is a broken and fragmentary cross-sectional view taken on line 3—3 of FIG. 2.

FIG. 4 is a fragmentary, cross-sectional view of an improved apparatus and method of this invention, FIG. 4 being taken substantially on line 4—4 of FIG. 5.

FIG. 5 is a cross-sectional view taken substantially on line 5—5 of FIG. 4.

FIG. 6 is a view similar to FIG. 4 and illustrates another embodiment of this invention.

FIG. 7 is a cross-sectional view taken substantially on line 7—7 of FIG. 6.

FIG. 8 is a fragmentary perspective view illustrating how each row of electrode means for the structure of FIGS. 6 and 7 can be formed from a single sheet of material.

FIG. 9 is a cross-sectional view similar to FIG. 7 and illustrates another embodiment of this invention.

FIG. 10 is a view similar to FIG. 8 and illustrates how each row of electrode means of the embodiment of FIG. 9 can be formed from a single sheet of material.

FIG. 11 is a schematic view illustrating the method of utilizing a plurality of passage defining means of this invention for serially removing particles from various branch flows of fluid.

FIG. 12 is an end view of a sheet of material for making a passage defining means of this invention.

FIG. 13 is a cross-sectional view similar to FIG. 9 and illustrates the use of the sheet of material of FIG. 12 in forming another embodiment of this invention.

FIG. 14 is a fragmentary, cross-sectional view similar to FIG. 4 and illustrates another embodiment of this invention.

FIG. 15 is a cross-sectional view taken on line 15—15 of FIG. 14 and is rotated 90°.

FIG. 16 is a view similar to FIG. 15 and illustrates another embodiment of this invention.

FIG. 17 is a view similar to FIG. 15 and illustrates another embodiment of this invention.

FIG. 18 is a cross-sectional view taken on line 18—18 of FIG. 17 and is rotated 90°.

FIG. 19 is a view similar to FIG. 18 and illustrates another embodiment of this invention.

FIG. 20 is a view similar to FIG. 14 and illustrates another embodiment of this invention.

FIG. 21 is a cross-sectional view taken on line 21—21 of FIG. 20 and is rotated 90°.

FIG. 22 is a view similar to FIG. 21 and illustrates another embodiment of this invention.

FIG. 23 is a fragmentary perspective view of the embodiment of FIG. 21 or FIG. 22.

FIG. 24 is a schematic plan view illustrating part of the passage means of the device illustrated in FIG. 23.

FIG. 25 is a fragmentary, cross-sectional view illustrating another embodiment of this invention.

FIG. 26 is a fragmentary top view of the embodiment illustrated in FIG. 25.

FIG. 27 is a fragmentary cross-sectional view illustrating another embodiment of the electrode means for the apparatus of FIGS. 1–3.

While a new embodiment of this invention is illustrated in FIGS. 1–3 and utilizes the various features of the aforementioned patent applications, it is deemed best to first fully describe the embodiments of FIGS. 4–26 so that a complete understanding of such features can be applied to the embodiment of FIGS. 1–3.

Accordingly, reference is now made to FIGS. 4 and 5, wherein an improved method and apparatus of this invention is generally indicated by the reference numeral 10 and comprises a tubular passage defining means 11 formed from electrically insulating material and having an inlet end or means 12 and an outlet end or means 13 with a plurality of exit means 14 intermediate the inlet means 12 and the outlet means 13 in a predetermined arrangement for a purpose hereinafter described.

For example, each exit means 14 can be formed integrally with the passage defining means 11 and has an opening 15 adjacent the internal peripheral surface 16 of the passage defining means 11, the exit means 14 being arranged into aligned rows 14A and 14B that are disposed parallel to each other and on opposite sides of the passage defining means 11 in a staggering relationship so that one of the exit means 14 in the lower row 14B illustrated in FIG. 4 is disposed substantially half way between an adjacent pair of exit means 14 in the upper row 14A illustrated in FIG. 4.

Adjacent each exit means 14 on the upstream side thereof, a small electrode means 17 is disposed in the electrical insulating material 18 of the passage defining means 11 so as to be disposed out of electrical contact with any liquid that would be passing through the passage defining means 11, each electrode 17 being suitably shaped, such as being pointed or the like, to enhance the degree of electrostatic attraction by the resulting non-uniform field as will be apparent hereinafter. Diametrically opposite each small electrode 17 is a large electrode means 20 also disposed in the electrical insulating means 18 of the passage defining means 11 so as to be electrically insulated from any liquid passing through the passage defining means 11. As illustrated in the drawings, the large electrode means 20 is substantially semicircular as illustrated in FIG. 5 and is substantially bisected by its respective opposed small electrode 17.

In this manner, it can be seen that there are two rows 17A, 20A and 17B, 20B of electrode means 17 and 20 disposed in parallel aligned relation on opposite sides of the passage defining means 11.

Thus, in each row 17A, 20A or 17B, 20B of electrode means 17 and 20, a large electrode means 20 is interposed in spaced relation between each adjacent pair of small electrode means 17 of the same row thereof whereby each large electrode means 20 is disposed between each exit means 14 disposed in the same row therewith.

The electrode means 17 and 20 are adapted to be charged by an electrostatic means 21 illustrated in FIG. 5 wherein one potential of the electrostatic means 21 is interconnected by suitable lead means 22 to all of the electrode means 17 and 20 in the upper row 17A, 20A of electrodes and the opposite potential of the electrostatic means 21 is interconnected by lead means 23 to all of the electrode means 17 and 20 in the lower row 17B, 20B of electrode means for the passage defining means 11.

For example, when viewing FIG. 4, the electrostatic means 21 is adapted to charge the electrode means 17 and 20 in the lower row 17B, 20B with a positive potential and to charge the electrode means 17 and 20 in the upper row 17A, 20A with an opposite negative charge.

In this manner, non-uniform electric fields are created between each pair of opposed electrode means 17 and 20 with such non-uniform fields being indicated by the reference numeral 24 in FIGS. 4 and 5. The non-uniform electrostatic fields 24 are so arranged that the more intense portion of each electrostatic field 24 between each pair of opposed small and large electrode means 17 and 20 is adjacent to the opening 15 of an exit means 14 disposed adjacent the small electrode 17 of the particular electrostatic field 24.

In this manner, it is believed that when fluid is delivered into the inlet means of the passage defining means 11 by a directing means 25, each electrostatic field 24 operates on the particles thereof in such a manner that the positively charged particles as well as some of the neutral or uncharged particles are drawn to the negatively charged electrode means 17 and 20 in the upper row 17A, 20B of electrode means while the negatively charged particles and some of the neutral or uncharged particles are drawn toward the positively charged electrode means 17 and 20 in the lower row 17B, 20B of electrode means.

Because the more intense portion of each electrostatic field 24 is adjacent the opening 15 of a particular exit means 14, it can be seen that as the fluid passes from left to right in FIG. 4 through the passage defining means 11, the first left-hand electrostatic field 24 will tend to gather the positively charged particles, as well as some of the neutral particles, and cause the same to move along the electrostatic field 24 toward the small electrode 17 adjacent the opening 15 of the first left-hand upper exit means 14 so that the same will pass out through the exit means 15 with a small portion of the fluid passing through the passage defining means 11 from left to right. Such first electrostatic field 24 while having a less intensive portion adjacent the first left-hand large electrode means 20, nevertheless, will tend to attract some of the negatively charged particles toward the lower portion of the passage defining means 11 so that when the same are conveyed further to the right by the means 25 passing the fluid through the passage defining means 11, the same will enter the more intense portion of the second left-hand electrostatic field 24 which is adjacent the inlet means 15 of the first left-hand lower exit means 14 so that the collected negatively charged particles, as well as some of the neutral particles, together with a small portion of the fluid passing through the passage defining means 11 will pass out through that particular exit means 14.

The second left-hand electrostatic field 24 likewise has the less intense portion thereof adjacent the large electrode 20 thereof but will still gather some of the positively charged particles that have passed the first exit means 14 toward the upper portion of the passage defining means 11 so that the same will enter the more intense portion of the electrostatic field 24 which is third from the left and is adjacent the opening 15 of the right hand upper exit means 14.

Thus, it can be seen that as the fluid passes from left to right in FIG. 4, portions of the positively charged particles as well as part of the neutral particles thereof are removed from the fluid out through the upper row 14A of exit means 14 while the negatively charged particles as well as some of the neutral particles are removed out through the bottom row 14B of exit means 14 and, depending upon the particles of the fluid and the number of exit means 14, substantially particle free fluid will reach the outlet means 13 of the passage defining means 11 to be removed by a moving means 26.

Therefore, since the electrode means 17 and 20 of this invention are not disposed in electrical contact with the fluid passing through the passage defining means 11, no current flow or loss is created and the charged particles are merely moved toward the particular exit means 14 by the force of the non-uniform fields 24 in the manner previously desribed so that the only work required by the apparatus and method of this invention is the work required to force the fluid through the passage defining means 11.

However, it is well known that if the passage defining means 11 is tilted at an angle with its inlet means 12 being higher than its outlet means 13, gravity will provide the work for passing a liquid through the passage defining means 11 provided a sufficient head of liquid is provided at the inlet means 12 thereof.

Also, it is to be understood that while the passage defining means 11 has been illustrated and described as having an upper row 14A of exit means 14 and a lower row 14B of exit means 14, such exit means 14 can be provided on opposed sides of the passage defining means 11 in opposed relation rather than across the top and bottom of the passage defining means 11 as described and illustrated.

The flow of fluid from the fluid supply means 25 for the passage defining means 11 can be so controlled relative to the sizes of the exit means 14 and the fluid receiving means 26 that sufficient fluid can be supplied by the means 25 into the passage defining means 11 without requiring a stepped reduction in the cross-sectional dimension of the passage defining means 11 downstream from each exit means 14. For example, the exit means 14 can each have restriction means therein so as to limit the amount of fluid passing therethrough and the outlet means 13 could also have a restriction means therein to limit the amount of fluid passing through the outlet means 13 whereby the rate of flow through the conduit means 11 can be readily controlled in relation to the amount of fluid entering the inlet means 12 thereof, as desired.

While the various features of this invention have been described as providing the non-uniform electrostatic field means by having external means continuously charging the electrode means 17 and 20 in the manner previously described, it is to be understood that permanent non-uniform electrostatic fields can be provided by utilizing suitably shaped permanent electrets, such as the electret material fully set forth in the U.S. Pat. No. 3,458,713 issued Jul. 29, 1969.

In U.S. Pat. No. 3,458,713 there is disclosed an electret material that can provide a high electric field of sensibly permanent duration and a full disclosure is provided as to how such electret material can be formed, the resulting electret being described as the electric analog of a permanent magnet.

It is believed that such electret material when formed in sheet form will have one polarity on one side thereof and an equal and opposite polarity on the other side thereof with such material permanently maintaining such polarity or charge for a long period of time, e.g., 10 years.

Therefore, it is one of the features of this continuation-in-part application to disclose how such electret material can be utilized to practice the features of this invention.

Accordingly, reference is now made to FIGS. 6, 7 and 8 of this invention wherein another method and apparatus of this invention is generally indicated by the reference numeral 10A and the parts thereof similar to the method and apparatus 10 of FIG. 4 are indicated by like reference letter A.

As illustrated in FIGS. 6 and 7, the method and apparatus 10A comprises a tubular passage defining means 11A having inlet means 12A and outlet means 13A to be respectively interconnected to the fluid feeding means 25 and removing means 26 in the manner previously described, the passage defining means 11A having a plurality of exit means 14A provided with entrances 15A in a manner similar to the passage defining means 11 of FIG. 4.

However, the electrode means for providing the non-uniform electrostatic fields across the passage defining means 11A with the more intense portions thereof respectively adjacent the entrance means 15 of the exit means 14A are formed from similar strips of electret material such as the electret strip 25 illustrated in FIG. 8. As illustrated in FIG. 8, the electret strip 25 has opposed surfaces 26 and 27 respectively provided with like opposed permanent charges in the manner fully set forth in the aforementioned U.S. Pat. No. 3,458,713. Thereafter, the strip 25 is slit at its top and bottom edges 28 and 29 in the manner illustrated in FIG. 8 in an alternating fashion so that angled fins 30 can be formed therefrom in the manner illustrated in Figure 8. The resulting electret strip 25 is embedded in the insulating material of the passage defining means 11A as illustrated in FIGS. 3 and 4 whereby each finned part 30, by being folded in the manner illustrated in FIG. 7, cooperates with the unfolded part 30' of an oppositely disposed strip 25 to provide a respective and permanent non-uniform electrostatic field with the more intense portion thereof adjacent a particular entrance means 15A of an exit means 14A.

Of course, the electret strip 25 utilized for the lower set of exit means 14A has the side thereof facing the upper electret strip 25 oppositely charged to the facing side of the upper electret strip so as to provide the non-uniform electrostatic fields in the manner previously described for the purposes previously described. In order to prevent the fluid passing through the passage defining means 11A from actually engaging the finned portions 30 of each electret strip 25 adjacent their respective exit means 14A, the entrance 25A of each exit means 14A is bifurcated around the particular finned portion 30 as illustrated by the passages 31 and 32 in FIG. 7 which rejoin on the other side of the particular finned portion 30. Thus, even the finned portions 30 are protected from direct contact with the fluid or other material being directed through the passage defining means 11A.

In this manner, since the electret material is forming permanent non-uniform electrostatic fields across the passage defining means 11A, the non-uniform electrostatic fields function in the manner previously described to remove the particles in the manner previously described.

Of course, the electret strip 25 can have the parts thereof forming the more intense portions of the electrostatic fields formed in other configurations as desired.

For example, reference is now made to FIGS. 9 and 10 wherein another method and apparatus of this invention is generally indicated by the reference numeral 10B and parts thereof similar to the apparatus 10A are indicated by like reference numerals followed by the reference letter B.

As illustrated in FIGS. 9 and 10, the slit portions of each electret strip 25A have been formed into cylindrical parts 33 to respectively cooperate with unformed parts 34 of the opposite strip 25A in the manner illustrated in FIG. 9 to provide the permanent non-uniform electrostatic fields across the passage defining means 11B with the more intense portions thereof being adjacent the entrances 15B of the exit means 14B.

Should it be found that the electret material can be of the type which will not be readily attacked by the particle containing fluid actually engaging the same or have the life or the permanency of its charge changed in an adverse manner, the electret material itself could form the passage defining means.

For example, reference is now made to FIGS. 12 and 13 wherein another method and apparatus of this invention is generally indicated by the reference numeral 10C and parts similar to the means 10 previously described are indicated by like reference numerals followed by the reference letter C.

As illustrated in FIG. 12, a single strip of material 35 that can be formed with a permanent charge is only charged in the areas 36 and 37 thereof in the manner as set forth in the aforementioned U.S. Pat. No. 3,458,713 except that each part 36 has its upper side with a positive charge and its lower side with a negative charge while each part 37 has its upper side with a negative charge and the lower side thereof with a positive charge. In addition, each charged area 37 is greater than its cooperating area 36 except that each area 36 has a permanent charge greater per square inch thereof than the charge per square inch in the cooperating area 37 thereof so that when the strip 35 is subsequently formed into the tubular form as illustrated in FIG. 13, each two charged areas 36 and 37 cooperate together to define a non-uniform field across the passage defining means 10C with the more intense portion thereof being adjacent an entrance means 15C of an exit means 14C for the purpose previously described.

Therefore, by taking the strip of material 36 and selectively and permanently forming the same into electret areas throughout the length thereof so that when the same is subsequently formed into tubular form, a plurality of permanent non-uniform electrostatic fields can be provided in an alternating manner across the tubular structure of 11C in much the same manner as the non-uniform fields provided by the charged electrodes 17 and 20 of FIG. 4 and the electret strips 25 in the embodiment of FIG. 6.

Also, it is to be understood that it may be found that when utilizing the electret feature of this invention, the larger electrode of each cooperating pair of electrets can have a greater or lesser charge per square inch thereof than the charge per square inch of the smaller electrode portion cooperating therewith to provide the desired results for removing the contaminants from the liquid passing through the particular passage defining means.

Further, it is to be understood that the electrode configurations of FIGS. 6–13 are not limited to electrets as such electrode configuration could provide for externally charged electrodes, as desired.

Therefore, it can be seen that this invention provides an improved method and apparatus for removing and/or separating particles from a fluid or the like carrying the same by electrostatic means which comprises charged electrode means or electret means electrically insulated from the fluid or the like that is passed through the passage defining means or arranged so as to be free from adverse effects of the fluid.

While the various passage defining means of this invention have been illustrated with each exit means thereof merely expelling its fluid, it is to be understood that each exit means could be the source for feeding fluid into a new passage defining means constructed in the same manner as the upstream passage defining means.

For example, reference is made to FIG. 11 where such a network of passage defining means 11 of this invention are interconnected together whereby various concentrates, etc., can be collected at desired points downstream thereof.

While the various passage defining means of this invention previously described have each been provided with projections 15 extending into the fluid passage 16 to provide means for exiting the attracted particles out of the exit means 14 in the manner previously described, it may be found that such projections 15 provide too much turbulence for a desired fluid flow rate through the passage defining means. If so, then a true laminar flow means can be provided for the fluid with the particles removing features of this invention being substantially the same.

For example, reference is now made to FIGS. 14 and 15 wherein another method and apparatus of this invention is generally indicated by the reference numeral 10D with parts thereof similar to the other methods and apparatus of this invention being indicated by like reference numerals followed by the reference letter D.

As illustrated in FIGS. 14 and 15, a first passage defining means 11D is mounted concentrically within an outer passage defining means 40 while being supported therein by a support means 41 in the manner illustrated in FIG. 15 to provide a space or passage 42 between the conduits or passage defining means 11D and 40. The inner passage defining means 11D has openings or exit means 14D passing therethrough in an alternating manner along diametrically opposed rows as illustrated in FIG. 14 while the outer tubular member 50 carries a plurality of smaller electrode means 17D and large electrode means 20D in a manner similar to the electrode means 17 and 20 of FIG. 4 so as to cooperate together to provide alternating non-uniform electrostatic fields across the passage defining means 11D with the fields respectively having the more intense portions thereof passing through the exit means 14D as illustrated in FIGS. 14 and 15.

Thus, since all of the electrode means 17D and 20D in the upper row thereof are of a like charge while the small and large electrode means 17D and 20D in the bottom row thereof in FIG. 14 are of a like and of an opposite polarity from the upper row, particles of one charge will be attracted out through the upper exit means 14D while particles of the opposite polarity will be directed out of the lower exit means 14D in the same manner as provided by the apparatus 10 of FIG. 4 except that the entire fluid flow through the inner conduit means 11D is a true laminar flow thereof and the flow between the conduits 11D and 40 is also a true laminar flow so that the oppositely attracted particles being received in the space 42 between the conduits 11D and 40 will mix to complement each other whereby there will be no particle travel back through the exit means 14D into the inner conduit means 11D.

Thus, it can be seen that the apparatus 10D provides for true laminar flow through the inner conduit means 11D while still utilizing the principles of alternating non-uniform electrostatic fields for the purpose previously described.

Also, instead of having externally charged small and large electrode means 17D and 20D, the alternating non-uniform electrostatic field arrangement of FIGS. 14 and 15 can be provided by a permanent electret structure previously described by forming the outer conduit 40 of electret material in substantially the same manner as provided by the material 35 in FIGS. 12 and 13. Alternately, such electret material can be embedded into insulating material forming the outer conduit 40, if desired.

For example, reference is now made to FIG. 16 wherein another embodiment of this invention is generally indicated by the reference numeral 10E and parts thereof similar to the apparatus 10D are indicated by like reference numerals followed by the reference letter E.

As illustrated in FIG. 16, the outer conduit means 40E has an upper row of alternating small and large electrodes 36E and 37E in a manner similar to the sheet 35 so that alternating non-uniform electrostatic fields can be provided between the large and small electrode means 36E and 37E so that the more intensive portion thereof will be passing through an opening means 14E in the inner conduit 11E to produce the non-uniform electrostatic field effect as illustrated in FIG. 14.

Of course, in the embodiments of FIGS. 14-17, as well as in the embodiments of FIGS. 17-19, the support means 41 between the inner and outer conduits could be located in a 6 o'clock position rather than at the 9 o'clock position illustrated to better support support the inner conduit.

Referring now to FIGS. 17 and 18, another embodiment of this invention is generally indicated by the reference numeral 10F and parts thereof similar to the apparatus 10D of FIG. 14 will be indicated by like reference numerals followed by the reference letter F.

As illustrated in FIGS. 17 and 18, the outer conduit means 40F carries the small electrode means 17F while the inner conduit means 11F carries the large electrode means 20F that cooperate therewith to provide the alternating, non-uniform electrostatic fields respectively having the intense portions thereof passing through opening means 14F in the inner conduit means 11F to provide the non-uniform electrostatic field effect illustrated in FIGS. 17 and 18 for the purpose previously described. The external charging means 21F can charge the large electrode means 20F through the supporting arrangement 41F between the inner and outer conduits 11F and 10F in the manner illustrated in FIG. 18.

As illustrated in FIG. 19, the electrode arrangement of the embodiment 10F of FIGS. 17 and 18 can be provided by the embodiment 10G wherein the outer conduit 40G is provided with the small electrets 36G while the inner conduit 11G is provided with the large electret areas 37G to provide the alternating non-uniform electrostatic field arrangement similar to the field arrangement illustrated in FIGS. 17 and 18.

Therefore, it can be seen that in the embodiments illustrated in FIGS. 14-19, a laminar flow of the liquid or fluid passing through the inner conduit means is provided as a laminar flow of liquid or fluid is also being provided in the space between the inner and outer conduits so that there is no disturbance in the fluid flow even though the particles are being moved into the space between the two conduits by the alternating non-uniform electrostatic field patterns previously described.

Also, it is to be understood that any adverse fields being created by ionic separation in the embodiments of FIGS. 4-19 can be neutralized in well known manners, such as by bringing ions of opposite polarity adjacent the removed ions such as in the embodiments of FIGS. 20 and 25 hereinafter described. However, it is believed that ionic neutralization will take place in the inner, outer conduit arrangement of FIGS. 14-19 because of the non-uniform field arrangement.

Should it be desired to provide the laminar flow previously described through the inner conduit without providing a completely surrounding outer conduit means as provided in the embodiments 14-19 for receiving the removed contaminants, another embodiment of this invention can be utilized and is generally indicated by the reference numeral 10H with parts thereof similar to apparatus 10D being indicated by like reference numerals followed by the reference letter H.

As illustrated in FIGS. 20 and 21, a main conduit means 11H is provided with the same carrying a plurality of large electrode means 20H which respectively cooperate with small electrode means 17H respectively being carried by an outer tubular conduit means 43 snaking about and being secured to the conduit means 11H in the manner illustrated in FIGS. 20, 21 and 23 so that the small electrode means 17H being carried by the outer conduit means 43 will be opposite an opening 14H in the main conduit 11H and cooperate with a large electrode 20H with the intense portion of the resulting field passing through the respective opening 14H.

Since the fluid flow in the outer winding conduit 43 must travel a greater distance between adjacent exit means 14H than the distance the fluid in the inner conduit means 11H must travel, the passage defining means 43 can be suitably inwardly necked at areas 44 between enlarged portions 45 thereof as illustrated in FIGS. 23 and 24 so as to speed up the flow of fluid therethrough because the large portion 45 thereof will be adjacent the exit means 14H, the enlarged portion 45 slowing down the fluid flow therethrough so as to be of the same speed as the speed of flow of the fluid passing through the larger conduit means 11H.

In this manner, as an upper small electrode means 17H of the embodiment 10H of FIG. 20 attracts its particular charged particles into the passage means 43 through the upper exit 14H, such charged particles are brought down to the next exit means 14H in the lower row of electrode means so as to be combined with the oppositely charged particles being brought into the passage defining means 43 by the lower electrode means 17H so as to tend to neutralize the particle content in the passage defining means 43 whereby there will be no attempt for such particles therein to reenter the main conduit means 11H through the passage means 14H.

Another embodiment for providing true laminar flow of the fluid having the particles removed therefrom is generally indicated by the reference numeral 50 in FIGS. 25 and 27 and comprises a housing means 51 having a plurality of compartments or passage means 52A, 52B, 52C, 52E, 52F, etc., circularly arranged throughout the length thereof whereby the particles in passages 52B and 52E are respectively removed either into the intervening passing means 52C or into the outboard passage means 52A and 52F as will be apparent hereinafter.

The walls 53 and 54 between the compartments 52B, 52C, 52E have exit means 55 passing therethrough in a manner similar to the exit means 14B previously described while the walls 56 and 57 respectively between the compartments 52A, 52B, ad 52E, 52F likewise have exit means 55 passing therethrough as illustrated in FIG. 26 so as to cooperate with large and small electrode means 58 and 59 similar to the electrode means 17 and 20 in producing alternating non-uniform electrostatic fields across the passage means 52B and 52E as illustrated in FIG. 26 for alternately removing the particles thereof out through the exits 55 so that charged particles of one polarity from the compartment 52B entering the compartment 52C will be joined by oppositely charged particles from the compartment 52B entering the compartment 52C. This feature is provided by having the external charging means 60 charging small electrodes 59 that operate on the exits 55 of the wall 53 with a charge opposite from the charge on the small electrodes 59 which operate on the exit means 55 in the wall 54.

Similarly the particles being drawn into the compartment 52A from the compartment 52B through the exits 55 and in the wall 56 will be combined with oppositely charged particles also being drawn into the chamber 52A from the next adjacent passage means on the other side of the wall 61 in the manner previously described. Likewise the compartment 52F is drawing particles of one polarity through the exit means from the compartment 52E through the exit means 56 of the wall 57 into the compartment 52F to be combined with oppositely charged particles being drawn from the compartment on the other side of the wall 62 in the manner previously described.

Therefore, it can be seen that the embodiment 50 of this invention permits alternating chambers in a circular arrangement of such chambers to be progressively decontaminated while every other passage therethrough has the concentration of particles therein increased, the entire fluid flow through the various passages of the embodiment 50 being true laminar flow arrangements.

In regard to FIG. 22, it can be seen that the arrangement provided therein is substantially the same as FIGS. 20 and 21 except that the large electrodes comprise electret area 37J carried by the main passage defining means 11J and that the small electrodes comprise electret areas 36J carried by the small winding outer passage means 43J.

Thus, while it is believed that the embodiments of FIGS. 4–13 will remove particles by the alternating non-uniform electrostatic field arrangements previously described even though the exit means 14 have projections 15 extending into the main flow streams, the various features of this invention could be utilized with true laminar flow of the fluids having the particles removed therefrom as provided by the embodiments illustrated in FIGS. 14–26.

It can be seen that in each of the previously described embodiments of this invention it may be found that the magnitude of the potential differential between each pair of cooperating large and small electrodes that creates a particular non-uniform electrostatic field need not necessarily be relatively large because it is believed that it is the intensity of the field lines adjacent the smaller electrode at the exit means of the apparatus that provides the greatest attraction for the oppositely charged particles as well as for the neutral particles, etc., and permits the same to be gathered toward each other and forced out of the exit means even though the like charges thereon tend to push them apart whereby adverse field forces created by charged particles separation are believed to be minimized. Of course, large potential differentials can be utilized if desired.

Further, when utilizing the above-described features in connection with an oppositely moving charged particle separation stream, such as in FIGS. 25 and 26, it can readily be seen that any adverse field forces provided by charged particle separation are substantially eliminated.

Another embodiment of this invention for utilizing the above-described features is illustrated in FIGS. 1–3 and is generally indicated by the reference numeral 70, the apparatus and method 70 of this invention comprising a plurality of plates disposed in stacked relation to define a plurality of parallel passages therebetween in much the same manner as provided by the well known electrodialysis process. Thus, the various plates of the apparatus 70 can be stacked in the vertical position illustrated in FIG. 2 so that fluid flow therebetween can be upwardly or downwardly in a vertical direction or the plates can be disposed horizontally so that the fluid flow therebetween will be in a horizontal direction.

In any event, the apparatus 70 comprises a plurality of electret plates 71 each being suitably formed in a like manner to define a plurality of large rectangular or square sections 72 interconnected together at the corners thereof and interconnected intermediate the same in a horizontal direction by small rectangular sections 73 as illustrated. The electret plates 71 are arranged in the stack 70 as illustrated in FIG. 2 so that the adjacent facing sides thereof has an opposite charge thereon whereby it can be seen that the plate 71A in FIG. 2 has the left hand side 74A thereof provided with a positive charge while the right hand side 75A thereof is provided with a negative charge. The electret plate 71B of the apparatus 70 has its side 74B also provided with a positive charge and its side 75B provided with a negative charge and since the large sections 72B of the plate 71B are disposed opposite the small sections 73A of the plate 71A as illustrated in FIG. 2, a non-uniform field 76 is created between each adjacent small section 73A and large section 72B of the plates 71A and 71B with the more intense portion thereof being adjacent the section 73A of the plate 71A as illustrated by the force lines in FIG. 2. Also, the small sections 73B of the plate 71B cooperate with the large sections 72A of the plate 71A to define the non-uniform fields 77 having the more intense portions thereof directed toward the plate 71B as illustrated in FIG. 2. Likewise, the plate 71C of FIG. 2 has its side 74C positively charged and its side 75C negatively charged so as to cooperate with the side 74A of the plate 71A to provide the alternately arranged non-uniform fields 78 and 79 respectively having the more intense portions thereof directed toward the plates 71A and 71C. If desired, the charge per square inch of the smaller sections 73 of each plate 71 can be larger, smaller or the same as the charge per square inch of the larger sections 72 of the same plate or the plate 71 that is to cooperate therewith. Also, each plate 71 could be encapsulated in insulating material, if desired.

A pair of separator plates 80 are disposed between each adjacent pair of electret plates 71 in the manner illustrated in FIG. 2 wherein the plates 80A and 80B are disposed between the electret plates 71A and 71B while the separator plates 80C and 80D are disposed between the electret plates 71C and 71A with the separator plates 80 being disposed closely adjacent electret plates 71 rather than towards its adjacent separator plate 80 in the manner illustrated in FIG. 2. Each separator plate 80 has a plurality of slots 81 passing therethrough with each slot 81 being so arranged that the same is located adjacent the more intense portion of a particular electrostatic field 76, 77, 78 or 79 in the manner illustrated in FIG. 2. In this manner, the particles, etc., attracted by the non-uniform fields 76–79 will respectively pass through the opening means 81 in the separator plates 80 as illustrated in FIG. 2.

The plates 71 and 80 are arranged in the stack 70 with substantially the spacing illustrated by suitable spacers (not shown) whereby the separator plates 80A and 80D define a vertical passage means 82 therebetween which receives the electret plate 71A while the separator plates 80C and 80D define a relatively wide vertical passage 83 therebetween. The separator plates 80A and 80B define a relatively wide passage means 84 therebetween. The electret plate 71C that is disposed between the separator plate 80C and another separator plate 80E is disposed in a relatively narrow vertical passage means 85 while the electret plate 71B is disposed within a relatively narrow vertical passage 86 defined between the separator plate 80B and another separator plate 80F. Thus, the stack 70 can be comprised of any number of a plurality of cooperating electret plates 71 and the separator plates 80 disposed therebetween in the module arrangement illustrated in FIG. 1 with such module arrangement repeating itself any number of times until the outside walls or end plates 87 and 88 are reached as illustrated in FIG. 2.

The left hand end plate 87 cooperates with an adjacent spacer 80G to define a narrow vertical passage 89 therebetween which receives a metallic plate 90 formed in the same manner as an electret plate 71 except that the same is externally charged by a charging device 91 in any suitable manner to have a charge thereon opposite to the charge on the facing side of the electret plate 71 that cooperates therewith to provide the non-uniform fields 76A and 77A illustrated in FIG. 2. Likewise, the end plate 88 cooperates with a separator plate 80H to define a narrow vertical passage 92 therebetween which receives a metallic electrode plate 93 formed in the same configuration as an electret plate 71 and is charged by the charging device 91 to have a charge thereon opposite to the charge on the facing side of the electret plate 71 that cooperates therewith to define the non-uniform fields 78A and 79A illustrated in FIG. 2. Of course, the plates 90 and 93 could be continuous throughout their length and still provide the non-uniform effect illustrated in connection with the electret plates 71C and 71B. Thus, the plates 90 and 93 could be the end conductive plates of a conventional electrodialysis stack.

In this manner, it can be seen that as a particle containing fluid flows vertically downwardly through the various vertical passages of the apparatus stack 70 illustrated in FIG. 2 and into the plane of the stack 70 as illustrated by the top cross-sectional view of FIG. 3, the adverse particles in the passage 83 are separated with the negative particles, as well as part of the neutral particles thereof moving through the openings 81 of the separator plate 80D into the vertical passage 82 while the adverse positive particles, as well as part of the neutral particles move through the openings 81 of the plate 80C into the vertical passage 85. Likewise, the adverse positive particles in the vertical passage 84 move through the openings 81 of the separator plate 80A into the vertical passage 82 to combine with the negative particles being drawn therein through the separator plate 80B so that neutralizing takes place on any charged particle separation influence on the charge particles in the passages 83 and 84. Obviously, the adverse negative particles in the passage 84 pass out through the openings 81 in the separator plate 80B into the vertical passage 86.

In this manner, as the fluid flows vertically downwardly in FIG. 2 the fluid in every other passage thereof has the adverse particles thereof removed out through exit means of the particular passage means to be received in passage means that contain the electret plates 71 so as to combine with oppositely charged and removed particles to provide a concentrated and neutral particle fluid flow in the passages that have the electret plates 71 whereas the fluid in the passages between the separator plates 80 gradually have the particles therein removed to provide substantially particle free fluid at the lower ends thereof.

By having the end electrode plates 90 and 93 oppositely charged, the same maintain the neutralizing effect at the outboard wide passages at the opposed ends of the stack 70 so that as the charged particles pass to the plates 90 and 93, the same gain or loss electrons as the case may be in the same manner provided at the end electrode plates of the aforementioned electrodialysis process. Also, the end plates 90 and 93 provide the field therebetween as in the conventional electrodialysis process for that conventional purpose in removing the particles, etc.

However, it is to be understood that the electrets and separator modules as illustrated in FIG. 1 could be so constructed and arranged that the same can be disposed in a circular array thereof so that no externally charged plates 90 and 93 need be provided therein as the circular array of passages would cooperate with each other in a manner that neutralization of the charged particle separation would be provided in the same manner that it is provided by the passages 85, 83, 82, 84 and 86 illustrated in FIG. 2 of the drawings. Also, it may be found that separator plates 80 need not be utilized as concentration and deconcentration may take place without charged particle diffusion being an adverse problem.

If it should be found that the vertical flow through the stack 70 creates too much turbulence at the openings 81 in the separator plates 80 so that charged particle diffusion takes place, the openings 81 in the separator plates 80 could be filled with charged particle selective or charged particle non-selective membranes in much the same manner as provided by the electrodialysis process so as to prevent charged particle migration once the charged particles have passed through the separator 80 by the aforementioned non-uniform fields. Alternately, the entire separator plate 80 could be a membrane sheet without any openings therein for the purpose of charged particle movement therethrough in the same manner as provided by the electrodialysis process. Thus, it may be found that the non-uniform field effects of this invention aid in causing the particles to move through the various known membranes at a faster rate than provided by the conventional electrodialysis process.

In any event, it can be seen that a more rapid separation takes place at each wide passage, such as passage 83 or 84, of the stack 70 than would be the case when only the outboard electrode plates 90 and 93 are utilized in a stack as provided in the electrodialysis process because at each wide passage 83 or 84, etc. the non-uniform fields are being utilized to rapidly move the charged particles in opposite directions for departicling of the fluid in the passage having the non-uniform fields imposed across the same.

Instead of utilizing electret plates 71 to produce the opposite charge sides as provided by each electret plate 71, an electrode plate 100 of FIG. 27 could be utilized in place of each of the electret plates 71 inbetween the separator plates 80.

In particular, each electrode plate 100 comprises a pair of metal plates 101 and 102 each formed in the same configuration as an electret plate 71 and embedded in suitable insulating material 103 to define a plurality of large rectangular or square sections 104 thereof and a plurality of small narrow rectangular sections 105 in much the same manner as the sections 72 and 73 of the plate 71 except that the metal plates 101 and 102 are separated from each other by the insulating material 103 and are oppositely charged by suitable external charging means 106 whereby the side 107 of the electret plate 100 could attract positive particles toward the same while the opposite side 108 would attract negative particles toward the same since the plates 101 and 102 are respectively provided with a negative and a positive charge.

While each non-uniformed field has been previously described as being created between a pair of electrodes of equal and opposite polarity, it is to be understood that the non-uniform fields of this invention might each be formed between a pair of electrodes of like polarity but of different intensity or be formed between a pair of electrodes one of which is at ground potential and the other of which is at a negative or positive potential.

It may also be found that the particles removed by the non-uniform fields of this invention could be liquid particles, gaseous particles, ions, etc. contained in the fluid being passed through the passage defining means of this invention.

It is believed that if the potential differential between the various electrodes of each embodiment of this invention that create the previously described non-uniform electrostatic fields is of such a strength and/or configuration, the same will create turbulence in the fluid passing through the respective apparatus by the phenomenon known as "electro convection."

For example, see the article, "Electrohydrodynamics: A Review of the Role of Interfacial Shear Stresses," by Melcher et al., pages 111–146, of the Annual Review of Fluid Mechanics, Vol. 1, 1969, and the article, "Surface Electro convection," by Malkus et al., pages 13–23, of the January, 1971, The Physics of Fluids, Vol. IV, No. 1, for the theories behind electroconvection.

Referring now to FIG. 2 of applicants's drawings, it can be seen that if the electrostatic non-uniform fields 76, etc. are of sufficient strength, the same will cause turbulence in the fluid passing through the large passages 83, etc. and also in the smaller passages 82, etc., to thereby cause complete mixing of the fluids in the various passages thereof for any desired purposes. For example, the mixing of the fluid in the larger passages 83, etc., would prevent polarization at the membranes 80A, etc., whereas the mixing of the fluid in the passages 82, etc., will permit oppositely charged particles to readily neutralize each other in the channels 82, etc.

Therefore, if the arrangement 70 of FIG. 2 could be utilized for desalination purposes, the electroconvection currents being created by the alternately arranged non-uniform electrostatic fields of this invention would prevent polarization at the product-facing sides of the membranes 80A, etc. and would provide complete neutralization of the oppositely charged ions and particles on the brine-facing sides of the membranes 80A, etc.

Whiles the forms and methods of this invention now preferred have been described and illustrated as required by the Patent Statute, it is to be understood that other forms and method steps can be utilized and still come within the scope of the appended claims.

What is claimed is:

1. A method for separating particles from a fluid carrying the same comprising the steps of directing said fluid through an inlet means of a passage defining means having an outlet means, electrostatically directing at least some of said particles intermediate said inlet means and said outlet means solely by an electrostatic action, creating electroconvection in said fluid intermediate said inlet means and said outlet means, and removing said fluid from said outlet means, said steps of electrostatically directing at least some of said particles and of creating electroconvection in said fluid comprising the step of creating a plurality of non-uniform electrostatic fields with each field at least partially extending across said passage means and with the higher intensity portion of each field being substantially oppositely located relative to the higher intensity portion of an adjacent non-uniform field.

2. A method as set forth in claim 1 and including the step of providing exit means in said passage defining means intermediate said inlet means and said outlet means thereof, said step of creating said non-uniform electrostatic fields comprising the step of disposing said fields so that the higher intensity portions of said fields are respectively disposed adjacent said exit means so that at least some of said directed particles will pass out through said exit means.

3. A method as set forth in claim 1 wherein said step of creating said non-uniform electrostatic field comprises the step of disposing a plurality of pairs of spaced apart electrodes relative to said passage defining means with each pair of electrodes creating one of said non-uniform fields therebetween.

4. A method as set forth in claim 3 and including the step of electrically insulating said electrodes from said fluid.

5. A method as set forth in claim 3 wherein said step of disposing said pairs of electrodes comprises the step of disposing said pairs of electrodes in aligned relation along said passage defining means so that said aligned pairs of electrodes define two rows of electrodes along said passage defining means, and charging the electrodes in the same row with a like charge thereon.

6. A method for separating particles from a fluid carrying the same comprising the steps of disposing said fluid into a plurality of adjacent passage means, disposing a plurality of electrode means in every other adjacent passage means so that a non-electrode receiving passage means is disposed between each pair of adjacent electrode receiving passage means, and charging and arranging said electrode means so that each pair of adjacent electrode receiving passage means defines a plurality of non-uniform electrostatic fields each at least extending partially across the respective non-electrode receiving passage means disposed therebetween and each with its higher intensity portion substantially oppositely located relative to the higher intensity portion of an adjacent field for said respective non-electrode receiving passage means for acting on said particles in said respective non-electrode receiving passage means to cause at least some of said particles to migrate to at least one of said electrode receiving passage means of said adjacent pair thereof and for creating electroconvection in said fluid in said respective non-electrode receiving passage means.

7. A method as set forth in claim 6 and including the step of disposing a plurality of pairs of separator plate means respectively between each pair of said electrode receiving passage means whereby each non-electrode receiving passage means is defined between each pair of adjacent separator plate means.

8. A method as set forth in claim 7 and including the step of providing exit means in each pair of adjacent separator plate means adjacent the more intense portions of the non-uniform electrostatic fields for the non-electrode receiving passage means defined therebetween.

9. A method as set forth in claim 6 and including the step of oppositely charging each pair of adjacent electrode means.

10. A method as set forth in claim 6 and including the step of creating electroconvection in said fluid in each pair of adjacent electrode receiving passage means with the respective said non-uniform electrostatic fields thereof.

* * * * *